United States Patent
Kodama et al.

(10) Patent No.: US 8,693,137 B2
(45) Date of Patent: Apr. 8, 2014

(54) FLUID DYNAMIC BEARING UNIT AND ROTATING DEVICE

(71) Applicant: Alphana Technology Co., Ltd., Fujieda (JP)

(72) Inventors: Mitsuo Kodama, Fujieda (JP); Ryusuke Sugiki, Fujieda (JP); Takuji Yamada, Yaizu (JP); Masafumi Mizuno, Yaizu (JP)

(73) Assignee: Samsung Electro-Mechanics Japan Advanced Technology Co., Ltd., Tokyo (JP)

( * ) Notice: Subject to any disclaimer, the term of this patent is extended or adjusted under 35 U.S.C. 154(b) by 0 days.

(21) Appl. No.: 13/711,203

(22) Filed: Dec. 11, 2012

(65) Prior Publication Data

US 2013/0163120 A1  Jun. 27, 2013

(30) Foreign Application Priority Data

Dec. 26, 2011  (JP) ................. 2011-284061

(51) Int. Cl.
G11B 17/02 (2006.01)
H02K 7/08 (2006.01)
F16C 32/06 (2006.01)

(52) U.S. Cl.
USPC ............................ 360/99.08; 310/90; 384/107

(58) Field of Classification Search
CPC ........... G11B 19/2036; G11B 19/2009; G11B 25/043; G11B 17/02; G11B 33/1473; F16C 17/107; F16C 33/107; F16C 33/745; F16C 2370/12; F16C 17/10; F16C 33/1085; F16C 32/0629; F16C 33/103
USPC ................... 360/99.08, 98.07, 99.04; 310/90, 310/156.01; 384/114, 107
See application file for complete search history.

(56) References Cited

U.S. PATENT DOCUMENTS

| 5,533,811 | A | 7/1996 | Polch et al. |
| 8,300,355 | B2 | 10/2012 | Yang |
| 2009/0140587 | A1 | 6/2009 | Popov et al. |
| 2010/0226601 | A1* | 9/2010 | Inazuka et al. ............... 384/107 |
| 2010/0277833 | A1 | 11/2010 | Sugiki |
| 2010/0315742 | A1 | 12/2010 | Kimura et al. |

(Continued)

FOREIGN PATENT DOCUMENTS

| JP | 2011-002024 A | 1/2011 |
| JP | 2011-012737 A | 1/2011 |
| JP | 2011-047439 A | 3/2011 |

*Primary Examiner* — Brian Miller
(74) *Attorney, Agent, or Firm* — Holtz, Holtz, Goodman and Chick, PC

(57) ABSTRACT

A rotating device includes a fluid dynamic bearing unit. The fluid dynamic bearing unit includes a shaft encircling member that encircles a shaft, an intermediate encircling member that encircles the shaft encircling member, a shaft holder formed with a shaft hole into which an end of the shaft is fitted to fix the shaft, a base-side encircling member fixed to the shaft holder and encircling the intermediate encircling member, and a ring member fixed to the intermediate encircling member and encircling a rod encircling member. A lubricant is present between a rotating body and a fixed body. A first air-liquid interface is present between the base-side encircling member and the intermediate encircling member, and a second air-liquid interface is present between the ring member and the rod encircling member.

20 Claims, 5 Drawing Sheets

(56) References Cited

U.S. PATENT DOCUMENTS

| | | |
|---|---|---|
| 2010/0321823 A1 | 12/2010 | Oe et al. |
| 2011/0026163 A1* | 2/2011 | Komori et al. ............. 360/234.1 |
| 2011/0064341 A1* | 3/2011 | Mizuno et al. ................ 384/114 |
| 2011/0279925 A1* | 11/2011 | Watanabe et al. .......... 360/99.08 |
| 2012/0063030 A1* | 3/2012 | Yamada et al. ............ 360/99.08 |
| 2012/0120526 A1 | 5/2012 | Sugiki |
| 2012/0183243 A1* | 7/2012 | Sugiki ........................... 384/107 |
| 2013/0234552 A1* | 9/2013 | Kodama et al. ................. 310/90 |

* cited by examiner

FLUID DYNAMIC BEARING UNIT AND ROTATING DEVICE

BACKGROUND OF THE INVENTION

1. Field of the Invention

The present invention relates to a fluid dynamic bearing unit and a rotating device.

2. Description of the Related Art

Disk drive devices like hard disk drives have been downsized but increased the capacity, and are loaded in various electronics. In particular, loading of the disk drive devices in portable electronics, such as a laptop computer and a portable music player, is advancing.

A Fluid dynamic bearing is known as a bearing unit for a disk drive device. According to this fluid dynamic bearing, a lubricant is filled in a space between a rotating body and a fixed body, and a non-contact condition between the rotator body and the fixed body is maintained by dynamic pressure produced in the lubricant when the rotator body rotates relative to the fixed body.

Disk drive devices employing the fluid dynamic bearing includes a rotating-shaft type disk drive device having the rotating body including the shaft, and a fixed-shaft type disk drive device having the fixed body including the shaft. For example, JP 2011-2024 A, JP2011-12737 A, JP 2011-47439 A, and U.S. Patent publication No. 2010/277833 A disclose conventional fixed-shaft type disk drive devices.

According to the fixed-shaft type disk drive devices of the above-explained conventional technologies, an air-liquid interface that is a boundary between the lubricant and the ambient air is located in a tapered seal provided in a part of the space between the rotating body and the fixed body. The tapered seal accomplishes a role of suppressing a leakage of the lubricant by a capillary phenomenon, and also serves as a buffer of, when a volume of the space changes due to the uplifting of the rotating body and the temperature change in the component, and when the volume of the lubricant changes due to vaporization or thermal expansion, covering such a change.

Accordingly, if the tapered seal is in a poor shape or has a poor dimensional precision, it becomes difficult to covering such a change.

The present invention has been made in view of the aforementioned circumstances, and it is an object of the present invention to provide a fluid dynamic bearing unit and a rotating device which can suppress a production error of a region where the air-liquid interface of a lubricant should be located.

SUMMARY OF THE INVENTION

To accomplish the above object, an aspect of the present invention provides a fluid dynamic bearing unit that includes: a first encircling member that encircles a shaft; a shaft holder formed with a shaft hole into which an end of the shaft is fitted to fix the shaft; a second encircling member which is fixed to the shaft holder and which encircles the first encircling member; a third encircling member which encircles another end side of the shaft and which is fixed to the shaft; and a fourth encircling member which is fixed to the first encircling member and which encircles the third encircling member, a lubricant being present between the first encircling member and the shaft, the first encircling member and the shaft holder, the first encircling member and the second encircling member, the first encircling member and the third encircling member, and the third encircling member and the fourth encircling member, respectively, a radial dynamic pressure groove being formed in either one of an inner circumference surface of the first encircling member and an outer circumference surface of the shaft, an air-liquid interface of the lubricant being in contact with an inner circumference surface of the second encircling member, and another air-liquid interface of the lubricant being in contact with an inner circumference surface of the fourth encircling member.

To accomplish the above object, another aspect of the present invention provides a rotating device that includes: a hub to which a recording disk is to be mounted; and a base that supports the hub in a freely rotatable manner via the fluid dynamic bearing unit of the above aspect, the base comprising a base annular protrusive part which encircles the second encircling member and which protrudes toward the hub, and the base annular protrusive part encircling a part of the hub.

To accomplish the above object, the other aspect of the present invention provides a fluid dynamic bearing unit that includes: a first encircling member that encircles a shaft between one end of the shaft and another end of the shaft; a shaft holder formed with a shaft hole into which the one end of the shaft is fitted to fix the one end of the shaft; a second encircling member which is fixed to the shaft holder and which encircles the first encircling member; a third encircling member which is fixed to the shaft at the another end side; a fourth encircling member which is fixed to the first encircling member, has one end encircling the third encircling member and has another end encircled by the second encircling member; a ring member which is fitted to an inner circumference surface of the fourth encircling member and which is provided at a location facing the third encircling member in a radial direction; and a lubricant continuously present between the first encircling member and the shaft, the first encircling member and the shaft holder, the first encircling member and the second encircling member, the first encircling member and the third encircling member, and the third encircling member and the ring member, an external diameter of the third encircling member reducing toward the another end of the shaft, and at least a part of a surface of the fourth encircling member encircled by the second encircling member having an external diameter changed toward the another end of the shaft.

Any combination of the above-explained structural elements and an interchange of the structural element and expression of the present invention with a method, a device, and a system, etc., are also effective as embodiments of the present invention.

According to the present invention, it becomes possible to suppress a production error of a region where the air-liquid interface of a lubricant should be located.

DETAILED DESCRIPTION OF THE PREFERRED EMBODIMENTS

Figure 1A:
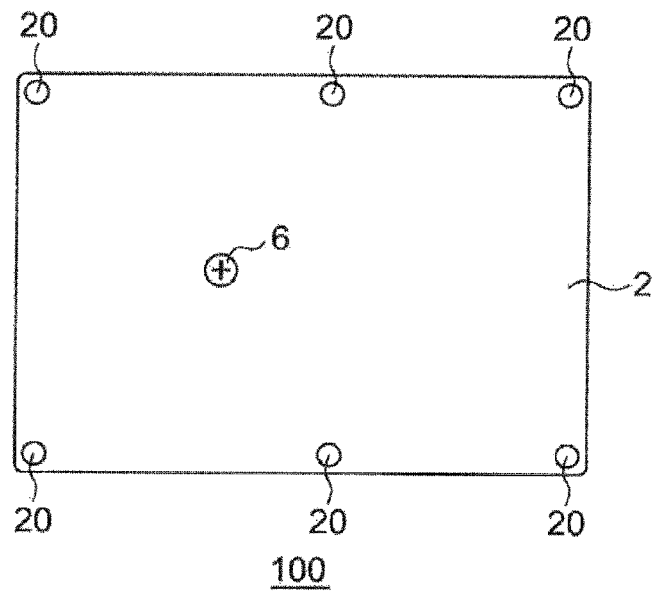
FIG. 1A is a diagram illustrating a rotating device according to a first embodiment.

In the following explanation, the same or equivalent structural element and component illustrated in respective figures will be denoted by the same reference numeral, and the duplicated explanation thereof will be omitted accordingly. The dimension of the component in each figure is enlarged or reduced as needed in order to facilitate the understanding. Some components not important to explain an embodiment in each figure will be illustrated in an omitted manner.

A rotating device according to an embodiment is suitably used as a disk drive device like a hard disk drive which rotates and drives a magnetic recording disk mounted thereon, and in particular, is suitably used as a fixed-shaft type disk drive device which has a shaft fixed to a base and which allows a hub to rotate relative to the shaft.

First Embodiment

Figure 1B:
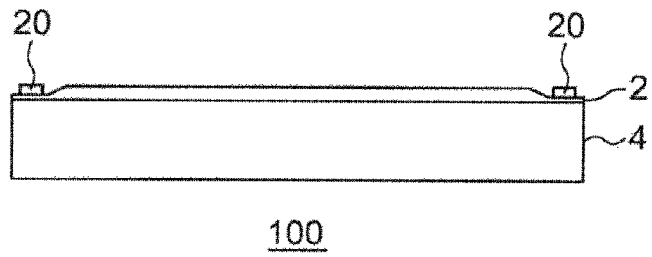
FIG. 1B is a diagram illustrating the rotating device according to the first embodiment.
Figure 1C:
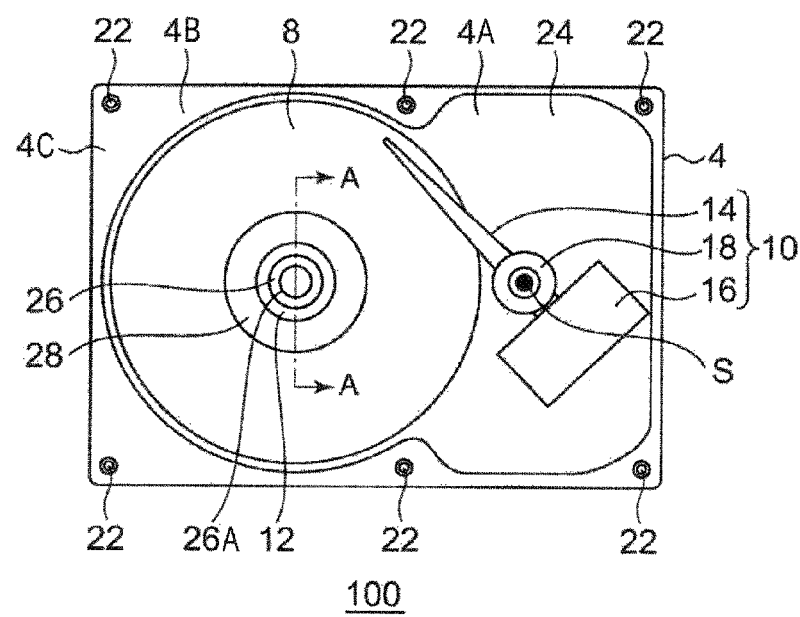
FIG. 1C is a diagram illustrating the rotating device according to the first embodiment.

FIGS. 1A to 1C are diagrams illustrating a rotating device 100 according to a first embodiment. FIG. 1A is a top view of the rotating device 100. FIG. 1B is a side view of the rotating device 100. FIG. 1C is a top view of the rotating device 100 with a top cover 2 being detached therefrom. The rotating device 100 includes a fixed body, a rotating body that rotates relative to the fixed body, a magnetic recording disk 8 attached to the rotating body, and a data reader/writer 10. The fixed body includes a base 4, a shaft 26 fixed to the base 4, the top cover 2, six screws 20, and shaft fixing screw 6. The rotating body includes a hub 28.

In the following explanation, it is presumed that a side at which the hub 28 is mounted relative to the base 4 is an upper side.

The magnetic recording disk 8 is, for example, a 2.5-inch magnetic recording disk having a diameter of 65 mm and formed of glass. The magnetic recording disk 8 has a center hole with a diameter of, for example, 20 mm, and has a thickness of, for example, 0.65 mm. For example, two magnetic recording disks 8 are to be mounted on the hub 28.

The base 4 is formed by die-casting with an aluminum alloy. The base 4 has a bottom part 4A that forms the bottom of the rotating device 100, and an outer circumference wall part 4B formed along the outer circumference of the bottom part 4A so as to surround the region where the magnetic recording disks 8 are to be disposed. The outer circumference wall part 4B has, for example, six screw holes 22 provided in an upper face 4C.

The data reader/writer 10 includes a recording/playing head (unillustrated), a swing arm 14, a voice coil motor 16, and a pivot assembly 18. The recoding/playing head is attached to the tip of the swing arm 14, records data in the magnetic recording disk 8, or reads the data therefrom. The pivot assembly 18 supports the swing arm 14 in a swingable manner to the base 4 around a head rotating shaft S. The voice coil motor 16 allows the swing arm 14 to swing around the head rotating shaft S to move the recording/playing head to a desired location over the top face of the magnetic recording disk 8. The voice coil motor 16 and the pivot assembly 18 are configured by a conventionally well-known technology of controlling the position of a head.

The top cover 2 is fastened to the upper face 4C of the outer circumference wall part 4B of the base 4 using, for example, six screws 20. The six screws 20 correspond to the six screw holes 22, respectively. In particular, the top cover 2 and the upper face 4C of the outer circumference wall part 4B are fastened together so as not to cause a leak to the interior of the rotating device 100 from a joined part thereof. The interior of the rotating device 100 is, specifically, a clean space 24 surrounded by the bottom part 4A of the base 4, the outer circumference wall part 4B thereof, and the top cover 2. The clean space 24 is designed so as to be hermetically sealed, i.e., so as to suppress any leak-in from the exterior or leak-out to the exterior. The clean space 24 is filled with clean air having particles eliminated. Hence, foreign materials like particles are prevented from adhering to the magnetic recording disk 8, thereby enhancing the reliability of the operation of the rotating device 100.

An upper end face of the shaft 26 is provided with a shaft-fixing screw hole 26A. The shaft 26 has a bottom end fixed to the base 4 by a scheme to be discussed later. A shaft fixing screw 6 passes all the way through the top cover 2 and is engaged with the shaft-fixing screw hole 26A, thereby fixing the upper end of the shaft 26 to the top cover 2 and the base 4.

According to a rotating device having both ends of the shaft 26 fixed to the chassis like the base 4 and the top cover 2 as explained above, among fixed-shaft type rotating devices, the shock resistance of the rotating device and the vibration resistance thereof can be enhanced. When a fluid dynamic bearing is applied to the rotating device of this type, in general, two air-liquid interfaces of a lubricant are present.

Figure 2:
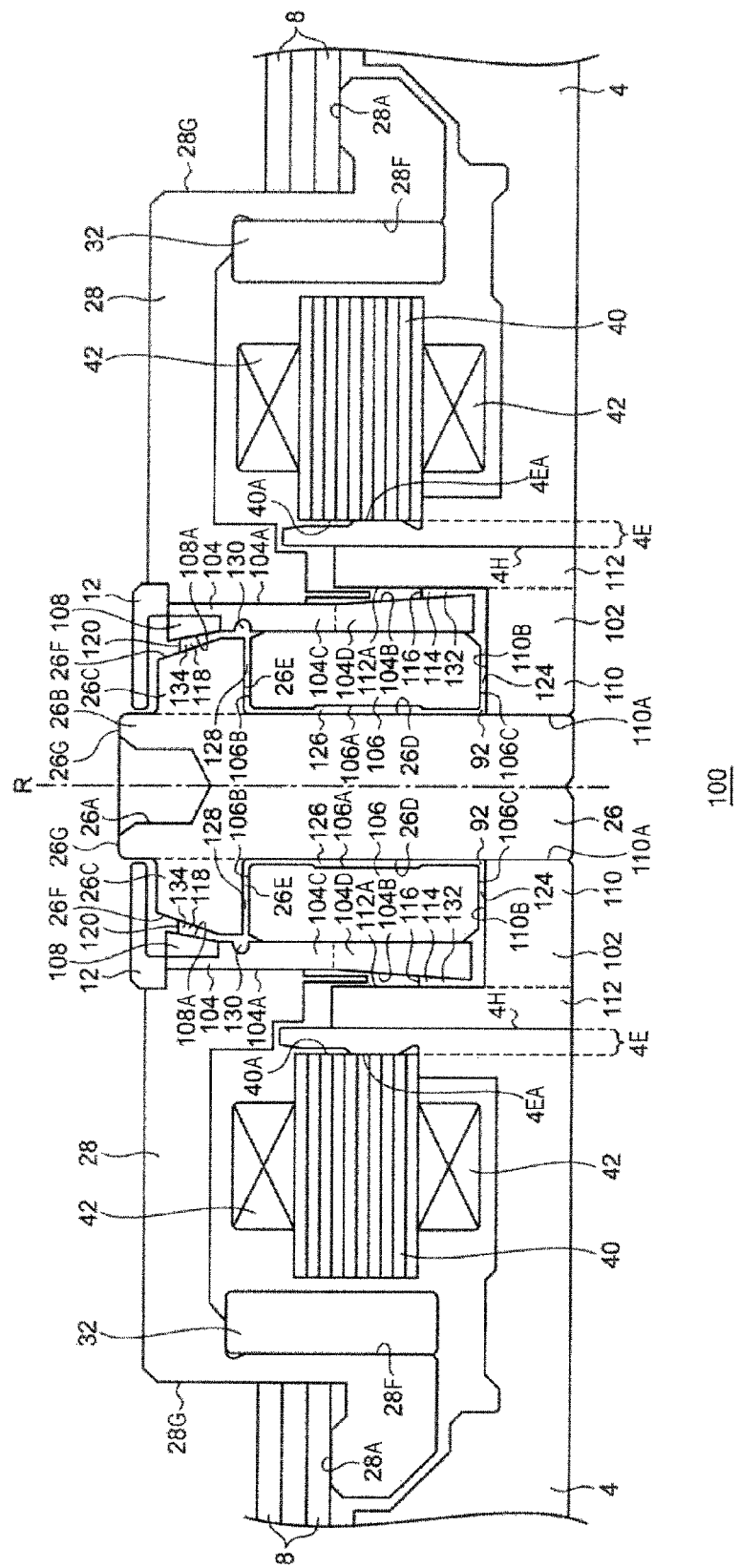
FIG. 2 is a cross-sectional view taken along a line A-A in FIG. 1C.

FIG. 2 is a cross-sectional view taken along a line A-A in FIG. 1C.

The rotating body includes the hub 28, a cylindrical magnet 32, an intermediate encircling member 104, a shaft encircling member 106, a ring member 108, and a cap 12. The fixed body includes the base 4, a laminated core 40, coils 42, a housing 102, and the shaft 26. A lubricant 92 is continuously present in some of a space between the rotating body and the fixed body.

When the rotating device 100 is manufactured, first, a fluid dynamic bearing unit including the housing 102, the intermediate encircling member 104, the shaft encircling member 106, the ring member 108, the lubricant 92, and the shaft 26 is manufactured. Next, the hub 28 and the base 4, etc., are attached to the fluid dynamic bearing unit, thereby finishing the rotating device 100. The base 4 supports the hub 28 in a freely-rotatable manner through the fluid dynamic bearing unit.

The magnetic recording disks 8 are to be mounted on a disk mounting face 28A of the hub 28. The hub 28 is formed of an iron-steel material like SUS 430F having a soft magnetism. The hub 28 is formed by pressing and cutting an iron-steel plate and is formed in a predetermined shape like a substantially cup shape having a center hole around a rotational axis R. As the iron-steel material, for example, stainless steel with a product name DHS1 made by DAIDO Steel Corporation is preferable since it has little out gas and is easy to machine. Likewise, stainless steel with a product name DHS2 made by the same company is further preferable since it has a better anticorrosion characteristic.

The cylindrical magnet 32 is bonded and fixed to a cylindrical inner circumference surface 28F corresponding to the internal cylindrical surface of the hub 28 in a substantially cup shape. The cylindrical magnet 32 is formed of a rare-earth material, such as neodymium, iron, or boron, and faces in the radial direction, for example, twelve protrusive poles of the laminated core 40. Magnetization of 16 poles for driving is performed on the cylindrical magnet 32 in the circumferential direction thereof, and a rust-proof treatment is applied to the surface of the cylindrical magnet 32 by, for example, electrodeposition coating or spray painting.

The laminated core 40 includes an annular part and, for example, twelve protrusive poles extending outwardly of the radial direction from the annular part, and is fixed at an upper-face side of the base 4. The laminated core 40 is formed by, for example, laminating 10 thin magnetic steel sheets, and joining those together by caulking. An insulation paint is applied to the surface of the laminated core 40 by electrodeposition coating or powder coating, etc. The coil 42 is wound around each protrusive pole of the laminated core 40. When a substantially sinusoidal drive current of three phases is caused to flow through the coils 42, driving magnetic fluxes are produced along the respective protrusive poles.

The base 4 includes a cylindrical protrusive member 4E around the rotational axis R of the rotating body. The protrusive member 4E protrudes toward the hub 28 from the upper face of the base 4 so as to encircle the housing 102. An outer circumference surface 4EA of the protrusive member 4E is engaged with a center hole 40A of the annular part of the laminated core 40, and thus the laminated core 40 is fastened with the base 4. In particular, the annular part of the laminated core 40 is bonded to and fastened with the protrusive member 4E by press fitting or loose fitting.

The housing 102 includes a flat and annular shaft holder 110, and a cylindrical base-side encircling member 112 fixed to an outer circumference of the shaft holder 110. The shaft holder 110 and the base-side encircling member 112 are joined together in such a way that the whole outer circumference surface of the shaft holder 110 contacts the lower part of an inner circumference surface 112A of the base-side encircling member 112, and in particular, the shaft holder 110 and the base-side encircling member 112 are formed together. In this case, the housing 102 can have a production error decreased, and a joining work can be eliminated. The base-side encircling member 112 is encircled by the protrusive member 4E. In particular, the base-side encircling member 112 is bonded and fixed to the inner circumference surface of the protrusive member 4E, i.e., a bearing hole 4H provided in the base 4 around the rotational axis R.

The shaft 26 has a lower end fitted in the inner circumference surface of the shaft holder 110, i.e., a shaft hole 110A provided in the shaft holder 110 around the rotational axis R, and is fixed thereto by bonding or press-fitting. The shaft 26 includes a columnar rod 26B around the rotational axis R, and a rod encircling member 26C which encircles the upper-end side of the rod 26B and is fixed to the rod 26B. In particular, the rod 26B and the rod encircling member 26C are formed together. In this case, the shaft 26 can have a production error decreased and a joining work can be eliminated.

The shaft encircling member 106 encircles a middle portion of the shaft 26 between the portion fitted in the shaft hole 110A and the portion encircled by the rod encircling member 26C. The lubricant 92 is present between the shaft encircling member 106 and the middle portion of the shaft 26. That is, an inner circumference surface 106A of the shaft encircling member 106 and an outer circumference surface 26D of the middle part of the shaft 26 face with each other via a first gap 126, and the lubricant 92 is filled in the first gap 126.

The shaft encircling member 106 is held between the rod encircling member 26C and the shaft holder 110 in the direction of a rotational axis along the rotational axis R. The lubricant 92 is present between the shaft encircling member 106 and the rod encircling member 26C, and between the shaft encircling member 106 and the shaft holder 110. That is, an upper face 106B of the shaft encircling member 106 and a lower face 26E of the rod encircling member 26C face with each other via a second gap 128, and the lubricant 92 is filled in the second gap 128. A lower face 106C of the shaft encircling member 106 and an upper face 110B of the shaft holder 110 face with each other via a third gap 124, and the lubricant 92 is filled in the third gap 124.

The intermediate encircling member 104 encircles the shaft encircling member 106. The hub 28 is fixed to an outer circumference surface 104A of an upper part 104C of the intermediate encircling member 104 by bonding or press-fitting. With respect to the positional relationship between the base-side encircling member 112 and the intermediate encircling member 104, the base-side encircling member 112 encircles a lower part 104D of the intermediate encircling member 104.

Formed between the base-side encircling member 112 and the intermediate encircling member 104 is a first tapered seal 114 where a fourth gap 132 between the inner circumference surface 112A of the base-side encircling member 112 and an outer circumference surface 104B of the lower part 104D of the intermediate encircling member 104 gradually becomes widespread toward the upper space. In particular, the inner circumference surface 112A of the base-side encircling member 112 is formed so as to be substantially parallel with the rotational axis R, while the outer circumference surface 104B of the lower part 104D of the intermediate encircling member 104 is formed so as to reduce the diameter as coming closer to a shaft upper end face 26G that is an upper end surface of the shat 26. Hence, a tapered shape of the first tapered seal 114 is realized. The first tapered seal 114 has a first air-liquid interface 116 of the lubricant 92, and suppresses a leak of the lubricant 92 by a capillary phenomenon. That is, the lubricant 92 is present at least partially between the base-side encircling member 112 and the intermediate encircling member 104. The first air-liquid interface 116 of the lubricant 92 is in contact with both inner circumference surface 112A of the base-side encircling member 112 and outer circumference surface 104B of the lower part 104D of the intermediate encircling member 104.

The ring member 108 is provided at a position which is at an upper-end side of the intermediate encircling member 104 and which faces the rod encircling member 26C in the radial direction. The ring member 108 encircles the rod encircling member 26C, and is fixed to the upper part 104C of the intermediate encircling member 104 by bonding. The ring member 108 is formed as a separate piece from the intermediate encircling member 104.

Formed between the ring member 108 and the rod encircling member 26C is a second tapered seal 118 where a fifth gap 134 between an inner circumference surface 108A of the ring member 108 and an outer circumference surface 26F of the rod encircling member 26C gradually becomes widespread toward the upper space. In particular, both inner circumference surface 108A of the ring member 108 and outer circumference surface 26F of the rod encircling member 26C are formed so as to reduce respective diameters as coming closer to the shaft upper end face 26G, and the ratio of the reduction of the diameter of the inner circumference surface 108A of the ring member 108 is smaller than the ratio of the reduction of the diameter of the outer circumference surface 26F of the rod encircling member 26C, and thus the tapered shape of the second tapered seal 118 is realized. That is, the internal diameter of the ring member 108 and the external diameter of the rod encircling member 26C decrease toward the shaft upper end face 26G. When the rotating body rotates, force outwardly of the radial direction and originating from centrifugal force acts on the lubricant 92 in the second tapered seal 118. Since the inner circumference surface 108A of the ring member 108 is formed so as to have a smaller diameter toward the shaft upper end face 26G, this force acts to suction the lubricant 92.

The second tapered seal 118 has a second air-liquid interface 120 of the lubricant 92, and suppresses a leak of the lubricant 92 by a capillary phenomenon. That is, the lubricant 92 is present at least partially between the ring member 108 and the rod encircling member 26C. The second air-liquid interface of the lubricant 92 is in contact with both inner circumference surface 108A of the ring member 108 and outer circumference surface 26F of the rod encircling member 26C.

The cap 12 is an annular member having a cross section of a reversed L shape and fixed to the upper face of the rotating body so as to cover the ring member 108 and the rod encircling member 26C.

Figure 3:
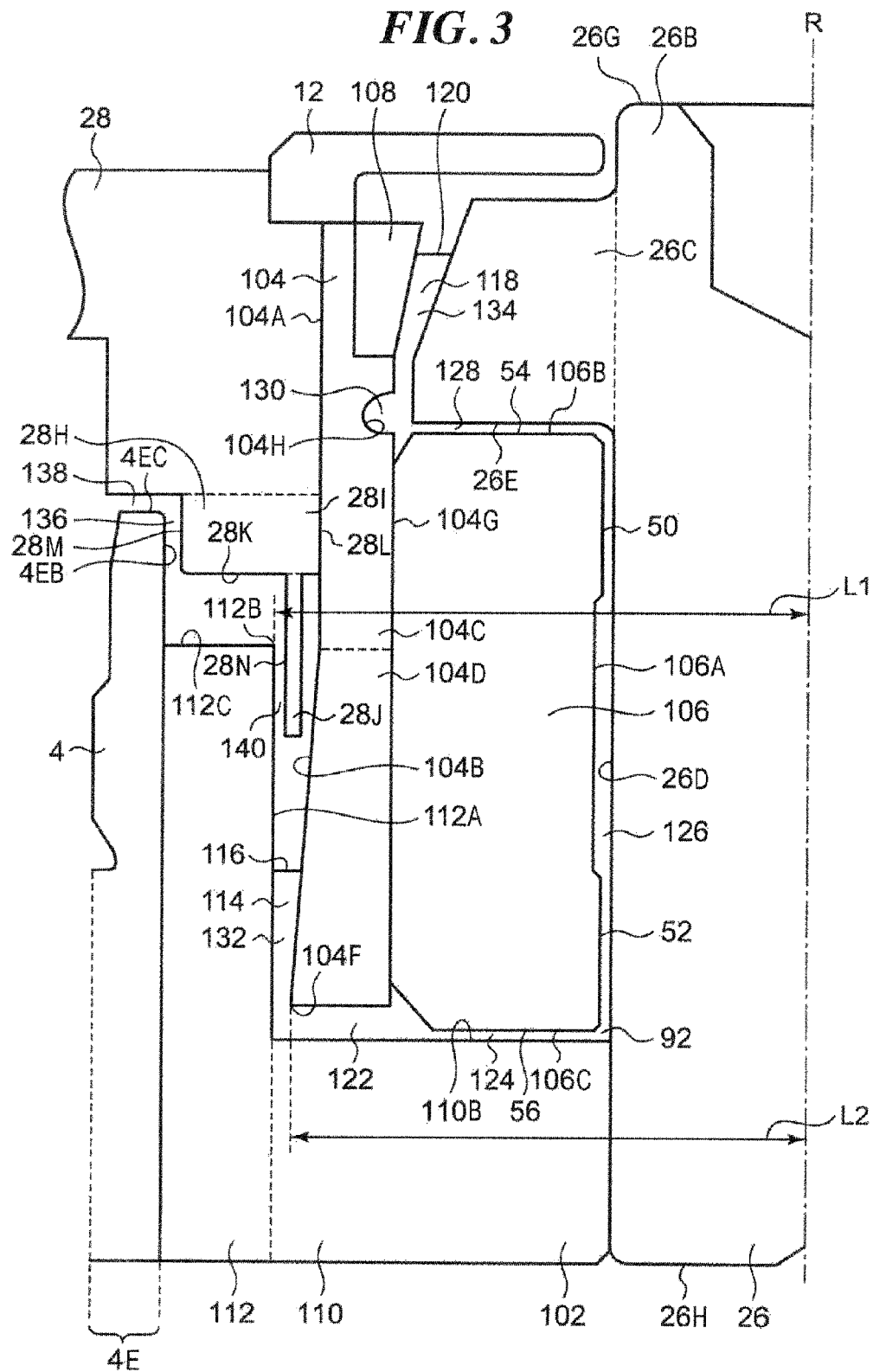
FIG. 3 is an enlarged cross-sectional view illustrating the left half of a fluid dynamic bearing unit illustrated in FIG. 2 and the periphery thereof in an enlarged manner.

FIG. 3 is an enlarged cross-sectional view indicating the left half of the fluid dynamic bearing unit in FIG. 2 and a periphery thereof in an enlarged manner. Formed in the inner circumference surface 106A of the shaft encircling member 106 are a first radial dynamic pressure groove 50 and a second radial dynamic pressure groove 52 in a herringbone shape and distant from each other in the axial direction. The first radial dynamic pressure groove 50 is formed above the second radial dynamic pressure groove 52. At least one of the first radial dynamic pressure groove 50 and the second radial dynamic pressure groove 52 may be formed in the outer circumference surface 26D of the middle portion of the shaft 26 instead of the inner circumference surface 106A of the shaft encircling member 106.

Formed in the upper face 106B of the shaft encircling member 106 is a first thrust dynamic pressure groove 54 in a herringbone or spiral shape. The first thrust dynamic pressure groove 54 may be formed in the lower face 26E of the rod encircling member 26C instead of the upper face 106B of the shaft encircling member 106.

Formed in the lower face 106C of the shaft encircling member 106 is a second thrust dynamic pressure groove 56 in a herringbone or spiral shape. The second thrust dynamic pressure groove 56 may be formed in the upper face 110B of the shaft holder 110 instead of the lower face 106C of the shaft encircling member 106.

When the rotating body rotates relative to the fixed body, the first radial dynamic pressure groove 50, the second radial dynamic pressure groove 52, the first thrust dynamic pressure groove 54, and the second radial dynamic pressure groove 56 produces dynamic pressures, respectively, to the lubricant 92. Such dynamic pressures support the rotating body in the radial direction and in the rotational axis direction in a manner non-contact with the fixed body.

The intermediate encircling member 104 and the ring member 108 are formed so as to have a smaller diameter than that of a circumference edge 112B of the inner circumference surface 112A of the base-side encircling member 112 at the shaft-upper-end-face-26G side. In particular, in the outer circumference surface 104B of the lower part 104D of the intermediate encircling member 104, a radius L2 of a circumference edge 104F at a side of a shaft lower end face 26H that is a lower end face of the shaft 26 becomes the maximum, and the outer circumference surface 104A of the upper part 104C of the intermediate encircling member 104 is formed so as to have a smaller radius than the radius L2 of the circumference edge 104F. Hence, the intermediate encircling member 104 is formed in such a way that the radius L2 of the circumference edge 104F is smaller than a radius L1 of the circumference edge 112B.

A passage of the lubricant 92 reaching from the first air-liquid interface 116 to the second air-liquid interface 120 includes a part of the fourth gap 132, a sixth gap 122 where the intermediate encircling member 104 and the shaft holder 110 face with each other in the rotational axis direction, the third gap 124, the first gap 126, the second gap 128, and a part of the fifth gap 134 in this order. A lubricant accumulator spot 130 for accumulating the lubricant 92 is provided over the passage of the lubricant 92 between the second air-liquid interface 120 and the second gap 128. In particular, the lubricant accumulator spot 130 is a space surrounded by the shaft encircling member 106, the intermediate encircling member 104, and the rod encircling member 26C. An annular recess 104H is provided in an inner circumference surface 104G of the intermediate encircling member 104, and this recess 104H forms a part of the lubricant accumulator spot 130. In this case, the lubricant accumulator spot 130 can be formed by relatively typical and easy machining, such as chamfering on the upper face 106B of the shaft encircling member 106, or trenching on the inner circumference surface 104G of the intermediate encircling member 104.

The protrusive member 4E of the base 4 encircles a part of the hub 28. That is, the hub 28 includes an entering member 28H that enters a space between the protrusive member 4E and the intermediate encircling member 104. Because of the presence of the entering member 28H, an end face of the protrusive member 4E at the shaft-upper-end-face-26G side, i.e., an upper face 4EC is located closer to the shaft upper end face 26G in the rotational axis direction than an end face of the base-side encircling member 112 at the shaft-upper-end-face-26G side, i.e., an upper face 112C.

The entering member 28H includes an annular entering base 28I, and an annular tapered entering part 28J that protrudes from a lower face 28K of the entering base 28I toward the first air-liquid interface 116. An inner circumference surface 28L of the entering base 28I is in contact with the outer circumference surface 104A of the upper part 104C of the intermediate encircling member 104, and an outer circumference surface 28M faces an inner circumference surface 4EB of the protrusive member 4E in the radial direction via a seventh gap 136. The upper face 4EC of the base 4 faces the hub 28 in the rotational axis direction via an eighth gap 138.

The tapered entering part 28J enters in the fourth gap 132 so as not to contact the first air-liquid interface 116. An outer circumference surface 28N of the tapered entering part 28J and the inner circumference surface 112A of the base-side encircling member 112 face with each other in the radial direction via a ninth gap 140.

The seventh gap 136, the eighth gap 138, and the ninth gap 140 function as a labyrinth for the lubricant 92 vaporized from the first air-liquid interface 116, and prevents the gaseous lubricant 92 from reaching the magnetic recording disk 8.

An explanation will now be given of an operation of the rotating device 100 employing the above-explained configuration. A drive current of three phases is supplied to the coils 42 in order to rotate the magnetic recording disk 8. The drive current flowing the coils 42 generate magnetic fluxes along the twelve protrusive poles. The magnetic fluxes apply torque to the cylindrical magnet 32, and thus the rotating body and the magnetic recording disk 8 engaged therewith rotate. Simultaneously, the voice coil motor 16 causes the swing arm 14 to swing, and thus the recording/playing head moves back and forth within the swingable range over the magnetic recording disk 8. The recording/playing head converts magnetic data recorded in the magnetic recording disk 8 into electric signals, and transmits the electric signals to a control substrate (unillustrated), and writes, as magnetic data, data transmitted from the control substrate in the form of electric signals in the magnetic recording disk 8.

According to the rotating device 100 of this embodiment, the ring member 108 that is formed separately from the intermediate encircling member 104 is fitted to the intermediate encircling member 104. The inner circumference surface 108A of the ring member 108 and the outer circumference surface 26F of the rod encircling member 26C form the second tapered seal 118, and both are formed so as to have a smaller diameter toward the shaft upper end face 26G. Hence, it becomes possible to fit the ring member 108 to the intermediate encircling member 104 at a later step in the manufacturing process of the fluid dynamic bearing unit. This results in an enhancement of the precision of the shape and dimension of the second tapered seal 118.

As an example, the intermediate encircling member 104 is fixed to the shaft encircling member 106, the shaft 26 is fitted in the shaft encircling member 106, the lower end of the shaft 26 is fixed to the shaft hole 110A of the shaft holder 110, and then the ring member 108 is fitted to the intermediate encircling member 104 like a "lid". This reduces a possibility that the inner circumference surface 108A of the ring member 108 and the outer circumference surface 26F of the rod encircling member 26C are scratched with each other and form scrapes during a work for members other than the ring member 108, and reduces a possibility that relatively large external force is applied to both surfaces and such surfaces are deformed. As a result, it becomes possible to enhance the precision of the shape and dimension of the second tapered seal 118.

Moreover, the fluid dynamic bearing unit can be assembled without a worry for such a scrape and a deformation, and thus the work efficiency improves.

Moreover, since the ring member 108 is formed as a separate piece, the machining precision of the inner circumference surface 108A of the ring member 108 can be further enhanced. This contributes a reduction of the production error of the second tapered seal 118.

In general, when a fluid dynamic bearing unit is manufactured, the location of the first air-liquid interface 116 and that of the second air-liquid interface 120 in the direction of the rotational axis are measured before the base 4 and the hub 28 are attached to the fluid dynamic bearing unit. According to the rotating device 100 of this embodiment, the intermediate encircling member 104 and the ring member 108 are formed so as to have a smaller diameter than that of the circumference edge 112B of the base-side encircling member 112. This facilitates an access to the first air-liquid interface 116 from the shaft-upper-end-face-26G side, and thus the location of the first air-liquid interface 116 in the direction of the rotational axis can be easily and precisely measured. For example, the first air-liquid interface 116 can be easily checked visually from the shaft-upper-end-face-26G side. Alternatively, when the first air-liquid interface 116 is irradiated with laser light to measure the location of the first air-liquid interface 116 in the direction of the rotational axis, the incident laser light to the first air-liquid interface 116 from the shaft-upper-end-face-26G side is not likely to be blocked. As a result, the location of the first air-liquid interface 116 can be further easily inspected.

Second Embodiment

The major differences between a rotating device of a second embodiment and the rotating device 100 of the first embodiment are the shape of the gap between the base-side encircling member 112 and an intermediate encircling member and the shape of a lubricant accumulator spot.

Figure 4:
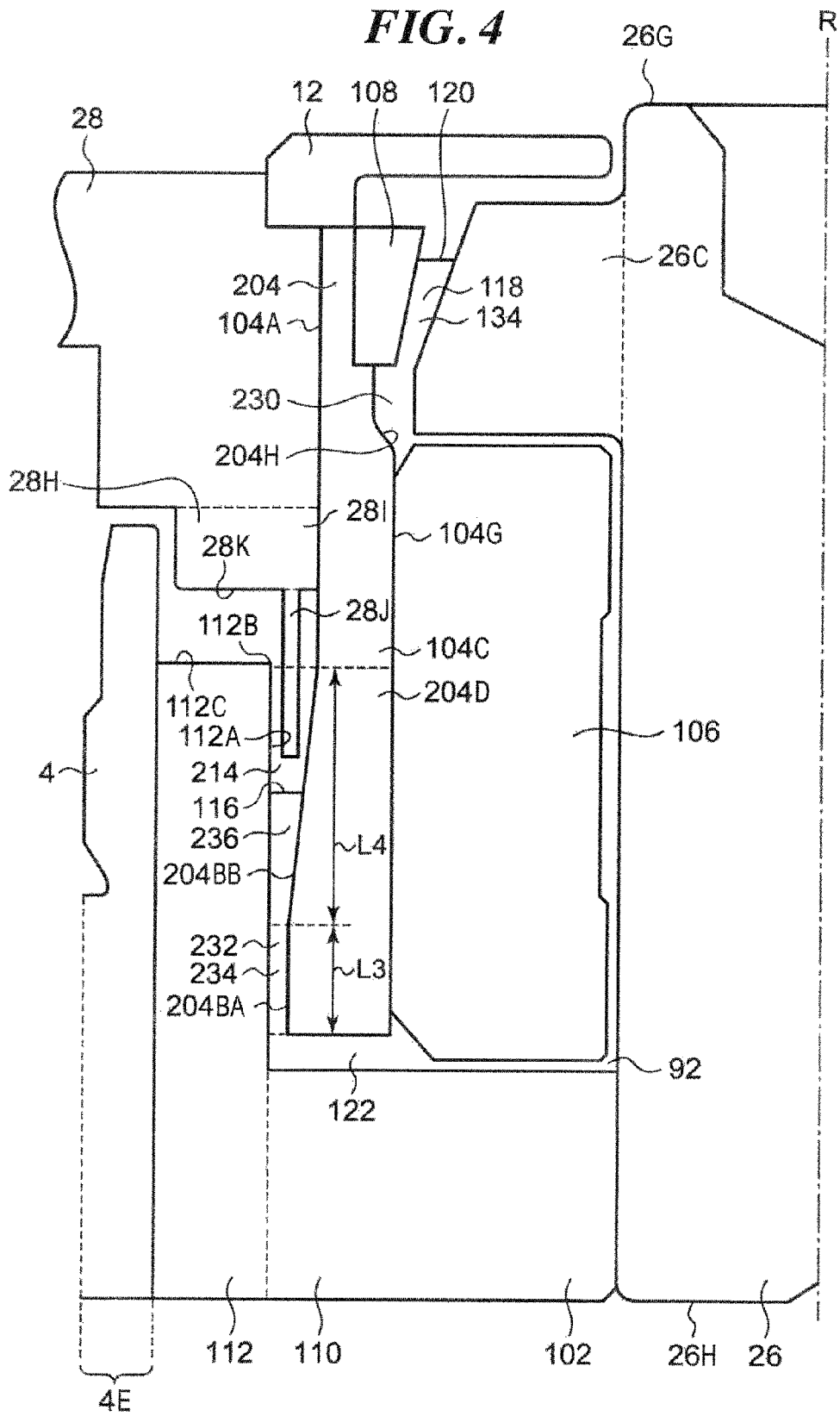
FIG. 4 is an enlarged cross-sectional view illustrating a left half of a fluid dynamic bearing unit of a rotating device according to a second embodiment and the periphery thereof in an enlarged manner.

FIG. 4 is an enlarged cross-sectional view illustrating a left half of a fluid dynamic bearing unit of the rotating device according to the second embodiment and the periphery thereof in an enlarged manner. FIG. 4 corresponds to FIG. 3.

A tenth gap 232 between an intermediate encircling member 204 and the base-side encircling member 112 includes a first gap part 234 having a substantially constant clearance, and a second gap part 236 having a clearance increased toward the shaft upper end face 26G. The first gap part 234 has a length L3 in the direction of the rotational axis shorter than a length L4 of the second gap part 236 in the direction of the rotational axis.

An outer circumference surface of a lower part 204D of the intermediate encircling member 204 includes a first outer circumference surface 204BA formed so as to be substantially parallel with the rotational axis R and the inner circumference surface of the base-side encircling member 112, and a second outer circumference surface 204BB formed so as to have a smaller diameter toward the shaft upper end face 26G. As illustrated in the figure, the first outer circumference surface 204BA is disposed at the shaft-holder-110 side, while the second outer circumference surface 204BB is disposed at the shaft-upper-end-face-26G side. The first outer circumference surface 204BA and the inner circumference surface 112A of the base-side encircling member 112 face with each other via the first gap part 234, and the second outer circumference surface 204BB and the inner circumference surface 112A of the base-side encircling member 112 face with each other via the second gap part 236. The second gap part 236 includes a third tapered seal 214 that becomes gradually widespread toward the upper space. The third tapered seal 214 includes the first air-liquid interface 116 of the lubricant 92, and the first air-liquid interface 116 contacts the second outer circumference surface 204BB.

A lubricant accumulator spot 230 is a space surrounded by the shaft encircling member 106, the intermediate encircling member 204, and the rod encircling member 26C. An annular increased-diameter part 204H is provided in the inner circumference surface 104G of the intermediate encircling member 204, and the increased-diameter part 204H forms a part of the lubricant accumulator spot 230. The increased-diameter part 204H is a part of the inner circumference surface 104G that increases the diameter toward the upper space.

According to the rotating device of this embodiment, the same advantages as those of the rotating device 100 of the first embodiment can be accomplished. In addition, according to the rotating device of this embodiment, in comparison with the rotating device 100 of the first embodiment, the first air-liquid interface 116 can be located closer to the second air-liquid interface 120 in the direction of the rotational axis. Hence, a pressure difference between the pressure at the first air-liquid interface 116 and the pressure at the second air-liquid interface 120 and a leak-out of the lubricant 92 due to the gravitational force acting on the lubricant 92 can be reduced.

Third Embodiment

The major difference between the rotating device 100 of the first embodiment and a rotating device of a third embodiment is a shape of the gap between the base-side encircling member and the intermediate encircling member.

Figure 5:
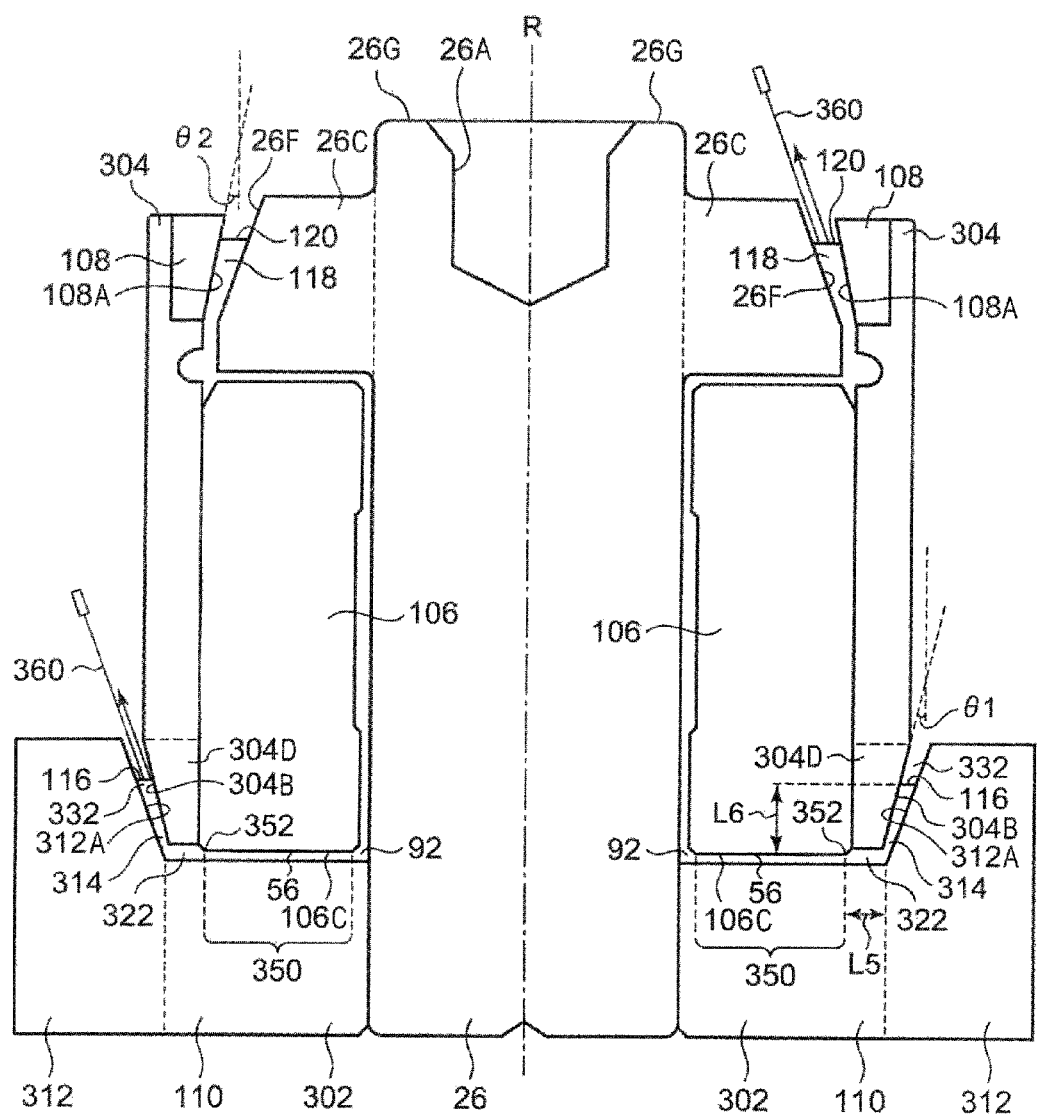
FIG. 5 is a cross-sectional view illustrating a fluid dynamic bearing unit of a rotating device according to a third embodiment.

FIG. 5 is a cross-sectional view of a fluid dynamic bearing unit of the rotating device according to the third embodiment. Formed between a base-side encircling member 312 of a housing 302 and an intermediate encircling member 304 is an 11th gap 332 which is a space between an inner circumference surface 312A of the base-side encircling member 312 and an outer circumference surface 304B of a lower part 304D of the intermediate encircling member 304 and which becomes gradually widespread toward the upper space to form a fourth tapered seal 314. In particular, both inner circumference surface 312A of the base-side encircling member 312 and outer circumference surface 304B of the lower part 304D of the intermediate encircling member 304 are formed so as to have a larger diameter toward the shaft upper end face 26G, and the inner circumference surface 312A of the base-side encircling member 312 has a larger ratio of increasing the diameter than the ratio of increasing the diameter of the outer circumference surface 304B of the lower part 304D of the intermediate encircling member 304, thereby realizing a tapered shape of the fourth tapered seal 314. The fourth tapered seal 314 includes the first air-liquid interface 116.

The outer circumference surface 304B of the lower part 304D of the intermediate encircling member 304 has the similar ratio of increasing the diameter to the ratio of decreasing the diameter of the inner circumference surface 108A of the ring member 108. That is, an angle θ1 formed by the cross section of the outer circumference surface 304B with the direction of the rotational axis is substantially equal to an angle θ2 formed by the cross section of the inner circumference surface 108A with the direction of the rotational axis. The same is true of the inner circumference surface 312A of the base-side encircling member 312 and the outer circumference surface 26F of the rod encircling member 26C.

The second thrust dynamic pressure groove 56 is formed in an annular region 350 in the lower face 106C of the shaft encircling member 106 around the rotational axis R. A distance L5 between an outer circumference 352 of the annular region 350 and the inner circumference surface 312A of the base-side encircling member 312 in the radial direction is smaller than a distance L6 between the first air-liquid interface 116 and the annular region 350 in the direction of the rotational axis when the rotating device stands still.

According to the rotating device of this embodiment, the same advantages as those of the rotating device 100 of the first embodiment can be accomplished. In addition, according to the rotating device of this embodiment, the inner circumference surface 312A of the base-side encircling member 312 is formed so as to have a larger diameter toward the shaft upper end face 26G. Accordingly, the second tapered seal 118 located at the right in the cross section of the fluid dynamic bearing unit is directed to the upper left direction, and the fourth tapered seal 314 at the left is also directed to the upper left direction. Hence, when respective locations of the first and second air-liquid interfaces 116 and 120 are measured by laser 360, the positions of both air-liquid interfaces can be measured without changing the incident angle of the laser 360 relative to the fluid dynamic bearing unit. For example, after the location of the first air-liquid interface 116 is measured, the fluid dynamic bearing unit can be moved in parallel with the laser 360 to cause the laser 360 to enter the second air-liquid interface 120. It is unnecessary to change the direction of the laser 360 and to change the posture of the fluid dynamic bearing unit during the measurement of the location of the first air-liquid interface 116 and the measurement of the location of the second air-liquid interface 120. Therefore, the number of processes in the fluid level inspection can be reduced, and the air-liquid interface of the fluid dynamic bearing unit can be inspected more efficiently.

The volume of a 12th gap 322 between the intermediate encircling member 304 and the shaft holder 110 varies relatively largely depending on whether or not the rotating body is floated, i.e., whether or not the rotating body is rotating. Moreover, the volume of the 12th gap 322 varies due to the thermal expansion of the intermediate encircling member 304 and that of the shaft holder 110. The larger the volume is, the larger the absolute value of the varying of the volume becomes. Moreover, the more the lubricant 92 is held in the 12th gap 322, the more the absolute quantity of the varying of the volume of the lubricant 92 due to thermal expansion becomes. Hence, according to the rotating device of this embodiment, setting is made so as to satisfy L5<L6 to relatively reduce the volume of the 12th gap 322. This suppresses a varying of the volume of the 12th gap 322 and a varying of the volume of the lubricant 92 held in the 12th gap 322. As a result, it becomes possible to prevent the first air-liquid interface 116 and the second air-liquid interface 120 from having respective locations varied. In other words, the tapered seal can be made small by what corresponds to the suppression of the varying of the locations of the air-liquid interfaces. When the tapered seal is made small, the volume of the air-liquid interface can be reduced, thereby reducing the vaporization amount of the lubricant 92.

The respective configurations and operations of the rotating devices of the embodiments were explained. Those embodiments are merely exemplifications, and it should be understood by those skilled in the art that various modifications can be made to a combination of the respective structural elements of those embodiments, and such various modifications are within the scope and spirit of the present invention.

According to the above-explained embodiments, the explanation was given of a so-called outer-rotor rotating device having the cylindrical magnet 32 located outwardly of the laminated core 40. The present invention is, however, not limited to this type, and can be applied to, for example, a so-called inner-rotor rotating device having the cylindrical magnet located inwardly of the laminated core.

In the above-explained embodiment, the explanation was given of the case in which the housing is directly attached to the base 4, but the present invention is not limited to this case. For example, a brushless motor including a rotating body and a fixed body may be assembled separately and then attached to the chassis.

Although the laminated core is applied in the above-explained embodiment, it is unnecessary that the core is the laminated type.

Regarding the rotating devices of the above-explained embodiments, the rotating body may include a communication passage of the lubricant 92 which allows the first tapered seal 114 to be in communication with the second tapered seal 118 separately from the first gap 126. In this case, a pressure difference between the first tapered seal 114 and the second tapered seal 118 can be reduced. This communication passage may include a passage provided in at least either one of the intermediate encircling member 104 and the shaft encircling member 106. In particular, the communication passage may include a recess provided in the outer circumference surface of the shaft encircling member 106 along the rotational axis R.

What is claimed is:

1. A fluid dynamic bearing unit comprising:
   a hub-side encircling member that encircles a shaft;
   a shaft holder formed with a shaft hole into which a first end of the shaft is fitted to fix the shaft;
   a base-side encircling member which is fixed to the shaft holder and which encircles the hub-side encircling member;

a rod encircling member which encircles a second end side of the shaft and which is fixed to the shaft; and a ring member which is fixed to the hub-side encircling member and which encircles the rod encircling member;

wherein:

a lubricant is present between the hub-side encircling member and the shaft, the hub-side encircling member and the shaft holder, the hub-side encircling member and the base-side encircling member, the hub-side encircling member and the rod encircling member, and the rod encircling member and the ring member, respectively;

a radial dynamic pressure groove is formed in one of an inner circumference surface of the hub-side encircling member and an outer circumference surface of the shaft;

a first air-liquid interface of the lubricant is in contact with an inner circumference surface of the base-side encircling member; and a second air-liquid interface of the lubricant is in contact with an inner circumference surface of the ring member.

2. The fluid dynamic bearing unit according to claim 1, wherein the inner circumference surface of the ring member is formed so as to have a smaller diameter toward the second end of the shaft.

3. The fluid dynamic bearing unit according to claim 2, wherein the base-side encircling member has the inner circumference surface formed so as to have a larger diameter toward the second end of the shaft.

4. The fluid dynamic bearing unit according to claim 1, wherein the hub-side encircling member and the ring member are formed so as to have a smaller diameter than a circumference edge of the inner circumference surface of the base-side encircling member at the second end side of the shaft.

5. The fluid dynamic bearing unit according to claim 1, wherein the shaft holder and the base-side encircling member are formed together, and the rod encircling member and the shaft are formed together.

6. The fluid dynamic bearing unit according to claim 1, wherein:

the hub-side encircling member is held between the shaft holder and the rod encircling member in a rotational axis direction along a rotational axis when the hub-side encircling member rotates relative to the shaft;

a thrust dynamic pressure groove is formed in one of a surface of the hub-side encircling member facing the shaft holder and a surface of the shaft holder facing the hub-side encircling member; and a lubricant accumulator spot is provided on a passage of the lubricant between the second air-liquid interface of the lubricant and a gap where the hub-side encircling member and the rod encircling member face each other.

7. The fluid dynamic bearing unit according to claim 6, wherein the hub-side encircling member comprises:

a shaft encircling member that encircles the shaft; and an intermediate encircling member that encircles the shaft encircling member; and wherein the lubricant accumulator spot comprises a space surrounded by the shaft encircling member, the intermediate encircling member, and the rod encircling member.

8. The fluid dynamic bearing unit according to claim 6, wherein:

the thrust dynamic pressure groove is formed in an annular region around the rotational axis; and the fluid dynamic bearing unit is configured such that a distance between an outer circumference of the annular region and the inner circumference surface of the base-side encircling member in a radial direction is shorter than a distance between the first air-liquid interface of the lubricant and the annular region in the rotational axis direction.

9. The fluid dynamic bearing unit according to claim 1, wherein:

a gap between the base-side encircling member and the hub-side encircling member comprises a first gap part that is substantially constant, and a second gap part that becomes wider toward the second end of the shaft; and a length of the first gap part in a rotational axis direction along a rotational axis when the hub-side encircling member rotates relative to the shaft is shorter than a length of the second gap part in the rotational axis direction.

10. A rotating device comprising:

a hub to which a recording disk is mountable; and a base that supports the hub in a freely rotatable manner via the fluid dynamic bearing unit according to claim 1;

wherein:

the base comprises a base annular protrusive part which encircles the base-side encircling member and which protrudes toward the hub; and the base annular protrusive part encircles a part of the hub.

11. The rotating device according to claim 10, wherein the base encircling protrusive part is formed such that an end of the base annular protrusive part at the second end side of the shaft is located closer to the second end of the shaft in the rotational axis direction than an end of the base-side encircling member at the second end side of the shaft.

12. The rotating device according to claim 10, wherein the part of the hub encircled by the base annular protrusive part enters a space between the base-side encircling member and the hub-side encircling member so as not to contact the first air-liquid interface of the lubricant.

13. A fluid dynamic bearing unit comprising:

a shaft encircling member that encircles a shaft between a first end of the shaft and a second end of the shaft;

a shaft holder formed with a shaft hole into which the first end of the shaft is fitted to fix the first end of the shaft;

a base-side encircling member which is fixed to the shaft holder and which encircles the shaft encircling member;

a rod encircling member which is fixed to the shaft at the second end side of the shaft;

an intermediate encircling member which is fixed to the shaft encircling member, and which has a first end encircling the rod encircling member and has a second end encircled by the base-side encircling member;

a ring member which is fitted to an inner circumference surface of the intermediate encircling member and which is provided at a location facing the rod encircling member in a radial direction; and a lubricant continuously present between the shaft encircling member and the shaft, the shaft encircling member and the shaft holder, the intermediate encircling member and the base-side encircling member, the shaft encircling member and the rod encircling member, and the rod encircling member and the ring member;

wherein an external diameter of the rod encircling member reduces toward the second end of the shaft; and wherein at least a part of a surface of the intermediate encircling member encircled by the base-side encircling member has an external diameter that changes toward the second end of the shaft.

14. The fluid dynamic bearing unit according to claim 13, wherein:

an internal diameter of the ring member reduces toward the second end of the shaft; and a reduction ratio of the internal diameter of the ring member is smaller than a reduction ratio of the external diameter of the rod encircling member.

15. The fluid dynamic bearing unit according to claim 13, wherein at least the part of the surface of the intermediate encircling member encircled by the base-side encircling member has a diameter reduced toward the second end of the shaft.

16. The fluid dynamic bearing unit according to claim 15, wherein:
  the surface of the intermediate encircling member encircled by the base-side encircling member comprises a part having a diameter reduced toward the second end of the shaft, and a part substantially parallel with the base-side encircling member; and
  the part having the diameter reduced is disposed at the second end side of the shaft, while the parallel part is disposed at the shaft-holder side.

17. The fluid dynamic bearing unit according to claim 13, wherein the shaft holder and the base-side encircling member are formed together.

18. The fluid dynamic bearing unit according to claim 13, wherein the shaft and the rod encircling member are formed together.

19. The fluid dynamic bearing unit according to claim 13, wherein:
  a surface of the base-side encircling member encircling the intermediate encircling member has an internal diameter increased toward the second end of the shaft;
  the surface of the intermediate encircling member encircled by the base-side encircling member has an external diameter increased toward the second end of the shaft; and
  an increase ratio of the internal diameter of the base-side encircling member is larger than an increase ratio of the external diameter of the intermediate encircling member.

20. The fluid dynamic bearing unit according to claim 19, wherein:
  an internal diameter of the ring member reduces toward the second end of the shaft; and
  the increase ratio of the external diameter of the intermediate encircling member is substantially the same as a reduction ratio of the internal diameter of the ring member.

* * * * *